Aug. 29, 1950  H. F. SMITH ET AL  2,520,573
BALL COCK LEVER ASSEMBLY
Filed Feb. 19, 1948

INVENTORS
HARRY F. SMITH
& HOWARD A. FULTON
BY
*Richey T Watts*
ATTORNEYS

Patented Aug. 29, 1950

2,520,573

UNITED STATES PATENT OFFICE 2,520,573

BALL COCK LEVER ASSEMBLY

Harry Ford Smith, Lexington, and Howard A. Fulton, Perrysville, Ohio, assignors to Mansfield Sanitary Pottery, Inc., Perrysville, Ohio, a corporation of Ohio Application February 19, 1948, Serial No. 9,485

5 Claims. (Cl. 137—104)

This invention relates generally to inlet valves for flush tanks and is particularly concerned with a new valve actuating lever assembly for a ball cock valve.

Inlet valves for flush tanks, especially of the ball cock variety as made heretofore, have had plunger operating mechanism consisting of two levers each pivoted to legs on the valve body and a link pivotally connecting adjacent free ends of these levers. The operation of this assemblage of parts is resisted by friction which develops at each of the several pivotal points and, furthermore, the application of operating force is in part dissipated by an inefficient arrangement of levers. The levers and links have been so positioned relative to each other that the force applied by the float bearing lever to the valve closing lever decreases progressively as the valve is closed.

The present invention aims to minimize the resistance in the valve closing lever assembly, to provide a simplified assembly of fewer parts than were previously used and for disassembly by removal of fewer screw parts, and to arrange the parts for substantially uniform and quite efficient transmission of forces from the float carrying lever to the valve closing lever. These objects are attained by the present invention, one embodiment of which is shown in the drawings accompanying and forming a part of this specification.

Figure 1:
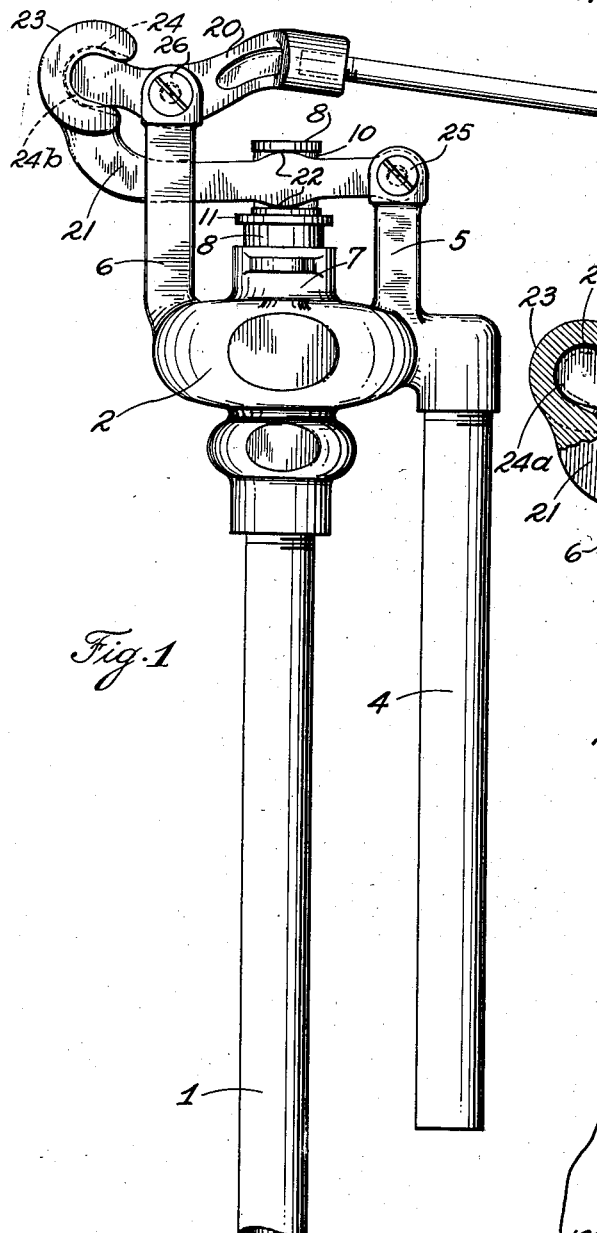
Fig. 1 is a side elevational view of a conventional ball cock valve for a flush tank provided with a valve actuating lever assembly constructed according to the present invention.

In the drawings, the inlet pipe 1 has a hollow body 2 screwed on to the upper end thereof. A valve seat 3 is screw-threaded into the hollow body 2 just above the upper end of pipe 1. A downwardly extending discharge pipe 4 is screwed into body 2 at one side of inlet pipe 1.

The body 2 has a short leg 5 and a long leg 6 extending upwardly from the top wall thereof for a purpose presently to appear. The upper wall of body 2 has a cylindrical projection 7 which defines an opening in which a plunger 8 may slide axially. This plunger, near its upper end, has a notch 10 formed in part by vertically spaced horizontal walls. A shoulder 11 below the notch serves to limit the extent to which the plunger may move into body 2. Packing 12, seated in an annular recess in plunger 8, bears against the cylindrical surface of projection 7 and serves to prevent escape of liquid from the body around the plunger. At its lower end plunger 8 passes through an opening in partition wall 13 of body 2. This opening has two opposed arcuate surfaces 14 to be engaged by and to guide the plunger and is enlarged, as is indicated at 15, on opposite sides of the plunger to permit fluid to flow from pipe 1 past the plunger and into the main chamber of body 2 when the valve is open. At its lower end plunger 8 has a gasket 16 attached thereto in position to seat on valve seat 3 when the plunger is at its bottom position.

From the foregoing description it will be understood that when the plunger 8 is in its down position gasket 16 will seat on valve seat 3 and prevent the flow of liquid out of pipe 1; and when plunger 8 is lifted so that gasket 16 no longer seats on seat 3, liquid may flow from pipe 1 through openings 15 into the main chamber of body 2 and thence out through pipe 4 into the flush tank.

Figure 2:
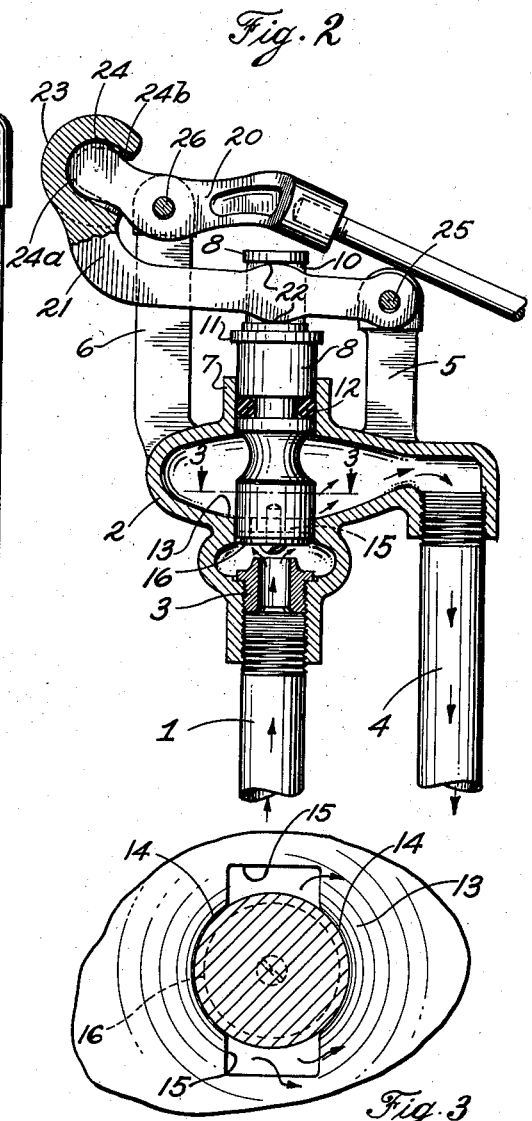
Fig. 2 is a side elevational view partly in vertical section of the upper part of the ball cock valve of Fig. 1.
Figure 3:
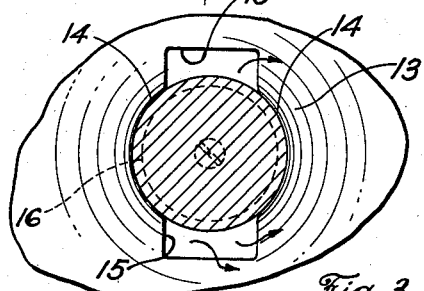
Fig. 3 is a fragmentary view taken on line 3—3 of Fig. 2.

The plunger actuating lever assembly illustrated in Figs. 1 and 2 comprises a float carrying lever 20 and a plunger actuating lever 21. Lever 20 is pivoted on pivot screw 25 between its ends to the upper end of leg 6. Its float-carrying end projects over plunger 10 while its free end projects beyond leg 6 and away from plunger 8 and terminates in an arcuate end surface 20a which preferably exceeds 180° but is less than about 270°.

The plunger actuating lever 21 is pivoted at one end on a pivot screw 26 to the upper end of leg 5, extends through notch 10 where arc shaped projections 22 on opposite sides thereof engage the horizontal surfaces of the notch to move the plunger endwise and projects beyond leg 6 where it bends outwardly and upwardly and terminates in a free end portion 23 having a grooved recess 24 into which the free end of lever 20 may project. Both of the pivot screws 25 and 26 are smaller in diameter than the pivot holes in the levers through which they extend and hence there is some lost motion between the pivots and levers.

Recess 24 is defined in part by a peripheral surface 24a which may be approximately semi-cylindrical or U-shaped as desired, and side surfaces 24b which project radially inward therefrom. This recess is sized to receive and retain the free end of lever 20 against lateral displacement without interfering with the free valve actuation movement of the levers. The free end of lever 21 extends upwardly far enough for the center of curvature of surface 24a to lie substantially on and coincide with the center of curvature of the curved peripheral edge surface of the free end of lever 20 and these centers of curvature lie approximately on the projection of a line connecting the centers of pivots 25 and 26. However, since these pivots are smaller than the openings in the levers pivoted thereon, the levers may move relative to the pivots sufficiently to make contact with one side of the pivots during one stroke of the levers and with the other side of the pivots during the alternate stroke of the levers. For example, when the float is moving upwardly and pivoting lever 20 counterclockwise (as seen in Fig. 2) around pivot 26, lever 20 engages the lower surface of pivot 26 and, while so engaged, exerts valve closing force on lever 21. At the same time, lever 21 engages the lower surface of pivot 25. On the contrary, when plunger 8 is lifted by water pressure, the levers 21 and 20 engage the upper surfaces of the pivots as shown in Fig. 2. By reason of the described arrangement of surfaces and pivots it will be understood that the point, place or area of interengagement of levers 20 and 21 will lie substantially on the projection of a line tangent to the surfaces of the pivots which engage with their levers when valve closing force is being exerted.

It will be noted, by reference to the drawings, that by reason of the shape and relative sizes of levers 20 and 21 and the locations of their pivot points, there is little or no relative movement between the engaging portions of surfaces 20a and 24 when the levers are moving to close the valve. In other words, the engaging parts of these two surfaces travel along substantially the same arc when the float is rising. Thus friction between these surfaces is kept at a minimum while the mechanical advantage remains substantially constant. As a result the valve closes with reduced friction and the closing force does not vary to a material extent.

It will also be seen that levers 20 and 21 are held in assembled position at all times despite the large clearances between the levers and their pivot screws and considerable movement of the levers relative to the pivot screws and each other.

It will also be obvious that the plunger may be removed by removing pivot screw 25 and withdrawing lever 21 endwise through leg 6. This ready removability is quite important in actual use of the device for prior devices have two or more screws which must be removed and usually the screws are difficult to remove due to corrosion or accumulation of foreign material in the screw threads.

Various modifications of the herein illustrated apparatus may be made by those skilled in the art but all such variations which do not involve invention are intended to be comprehended within the scope of what is claimed.

What is claimed is:

1. In a ball cock assembly including a hollow body, a plunger axially movable through the top wall of said body, long and short parallel legs projecting upwardly from the top wall of said body on opposite sides of said plunger, pivots in the upper ends of said legs, a lever assembly comprising a float carrying lever pivoted between its ends on the pivot in the upper end of the said long leg with its free end extending away from said plunger and having an arcuate end surface, and a plunger actuating lever pivoted at one end on the pivot in the upper end of said short leg and operatively engaging said plunger, extending outwardly and upwardly beyond the free end of the long leg and having an arcuate grooved recess near its free end opening toward and adapted to receive and prevent lateral displacement of the free end of said float carrying lever, the centers of curvature of said arcuate end surface and said arcuate grooved recess substantially coinciding and lying substantially on the projection of a straight line connecting the centers of said pivots.

2. The combination claimed in claim 1 in which the free end of the float-carrying lever has a convex arcuate peripheral surface and the grooved recess of the plunger actuating lever has a concave arcuate peripheral surface.

3. The combination claimed in claim 1 in which the free end of the float-carrying lever has an arcuate peripheral surface whose length exceeds 180° but does not exceed about 270° and the peripheral surface of the recess in the plunger actuating lever is U-shaped.

4. The combination claimed in claim 1 in which the arcuate end surface of the float carrying lever and the arcuate grooved recess of the plunger actuating lever engage substantially on a projection of a straight line tangent to the surfaces of said pivots at their engagement with their levers when the levers are in plunger closing position.

5. A lever assembly for a ball cock valve comprising a float carrying lever pivoted between its ends to a support and having an arcuate surface at its free end, a plunger actuating lever pivoted at one end to a support and having its other end extending at an angle to the float carrying lever and terminating in an arcuate grooved recess opening toward said plunger and receiving the free end of said float carrying lever, the centers of curvature of said arcuate surface and said arcuate recess substantially coinciding and substantially lying on a projection of a straight line connecting the pivots of said levers.

HARRY FORD SMITH.
HOWARD A. FULTON.

REFERENCES CITED

The following references are of record in the file of this patent:

UNITED STATES PATENTS

| Number | Name | Date |
| --- | --- | --- |
| 1,033,100 | Henn | July 23, 1912 |
| 1,065,841 | Rodehaver | June 24, 1913 |
| 1,253,109 | Taylor | Jan. 8, 1918 |
| 1,723,205 | Peterson | Aug. 6, 1929 |